United States Patent Office 3,534,520
Patented Oct. 20, 1970

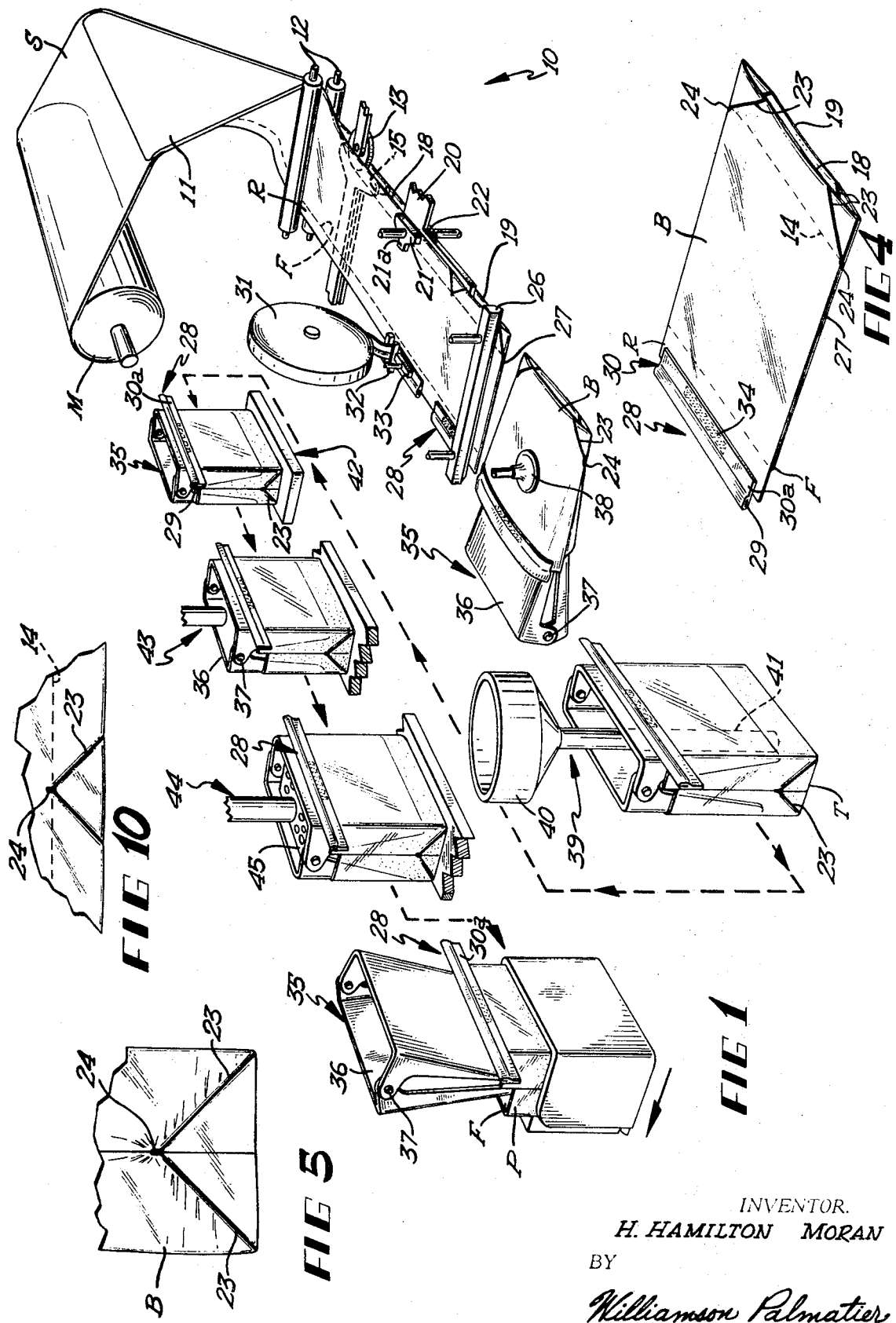

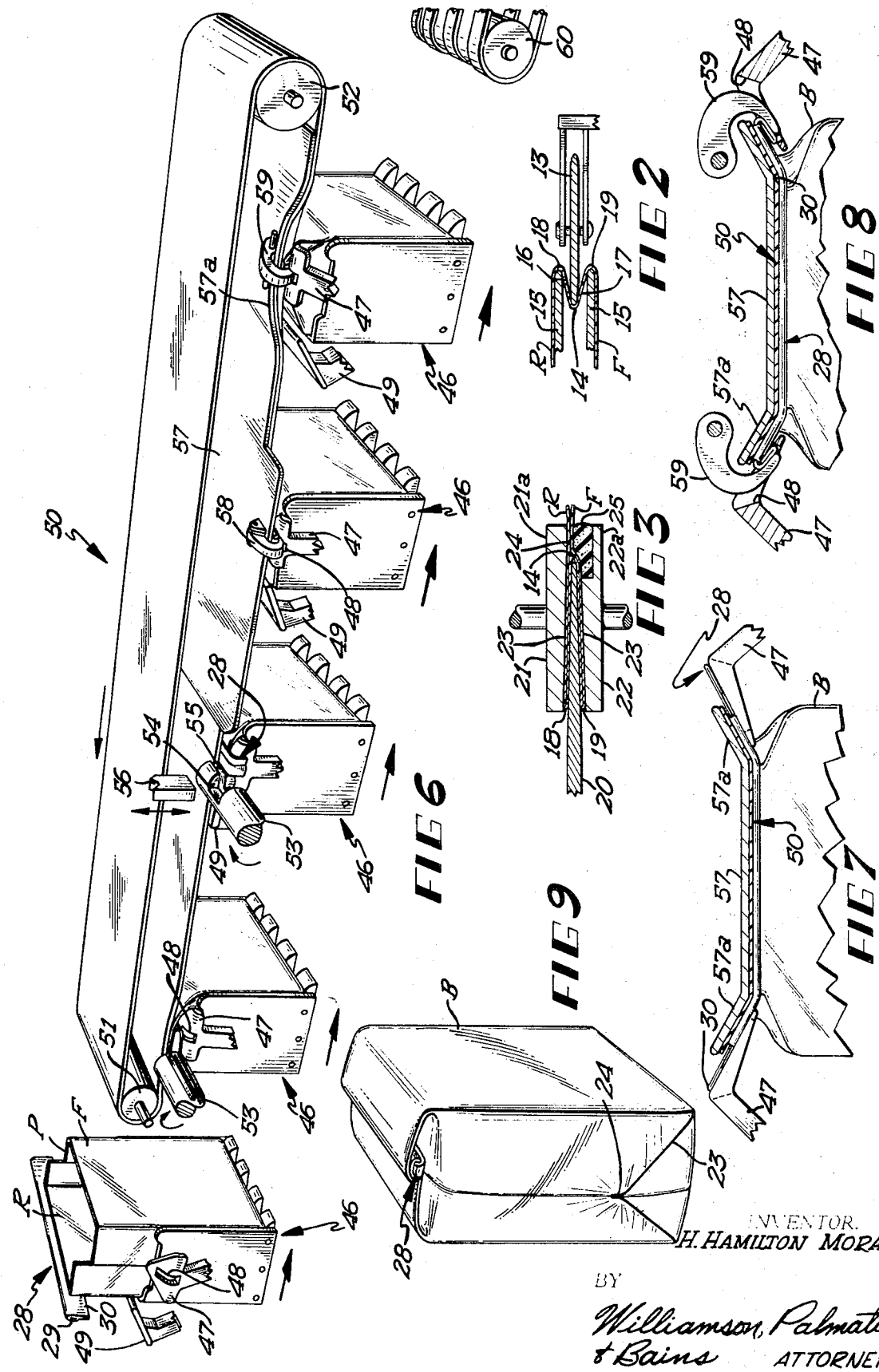

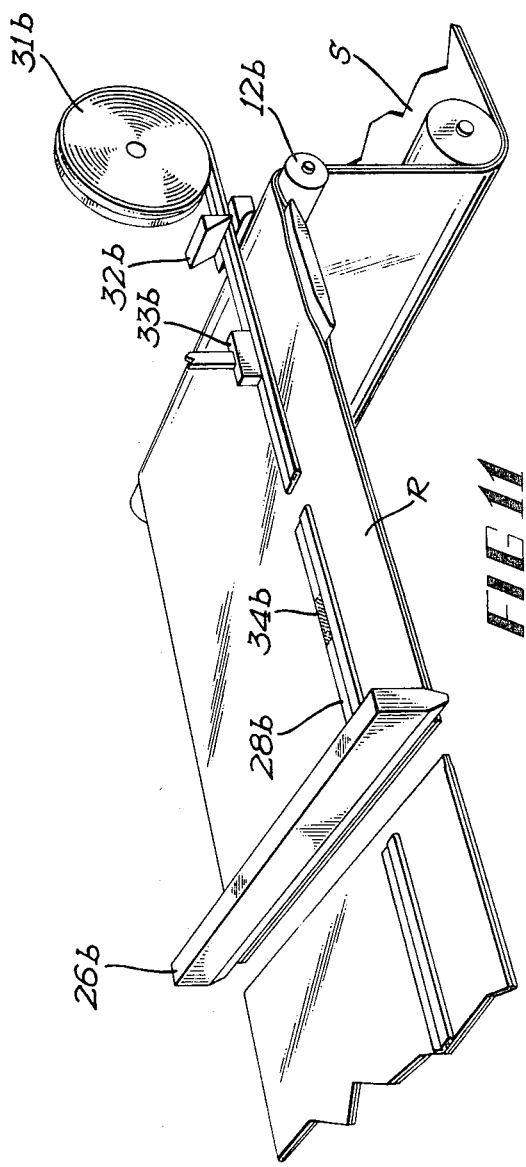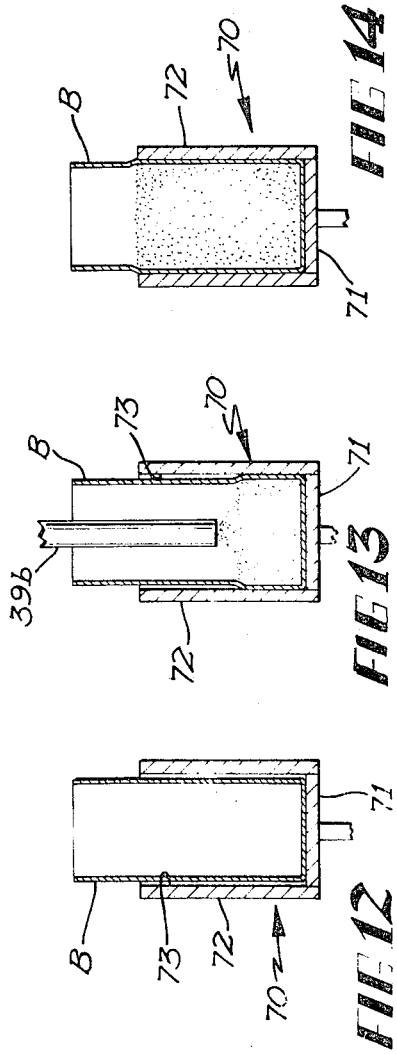

3,534,520
THERMOPLASTIC BAG AND PROCESS OF FORM-
ING, FILLING AND CLOSING THE SAME
Harry Hamilton Moran, Rte. 1, Box 324,
Wayzata, Minn. 55391
Continuation of application Ser. No. 590,417, Oct. 28,
1966. This application June 25, 1969, Ser. No. 841,670
Int. Cl. B65b 43/04, 61/00
U.S. Cl. 53—14                                    9 Claims

ABSTRACT OF THE DISCLOSURE

Process for making, filling, and closing a thermoplastic bag wherein a sheet of thermoplastic material is folded and tucked to form a bottom gusset. The bottom gusset portion is each sealed with an inverted V-shaped seal, and the sheet forming the partially formed bag is severed with a severing and welding medium along a line by secting the V-shaped seal to form a bag which has a generally squared bottom. Each bag is filled with a particulate material which is somewhat compressed in the bag to slightly stretch the same so that the bag will be snugly filled as a result of subsequent cold flow of the plastic material. The bag is then mechanically closed by tucking and collapsing the upper unfilled portion of the bag, and thereafter revolving a tin-tie fastener which is secured to the face of a bag panel. The ends of the tin-tie are bent upon itself and these bent ends are further bent upon themselves and tucked interiorly of the folded tucked side portions of the bag.

---

This application is a continuation of Ser. No. 590,417, filed Oct. 28, 1966, and now abandoned.

Although many thermoplastic bags are now commercially available and are used in packaging fruit, cereals, fertilizers and many other products, these bags do not seem to be completely satisfactory for use in packaging granular and pulverulent material therein. Perhaps one of the most widely used thermoplastic materials in the packaging field is polyethylene, since it is readily available and is inexpensive. However, attempts to package particulate material, especially pulverulent materials, such as flour, confectioners sugar and the like in polyethylene bags have been met with a number of problems. For example, one problem associated with packaging the pulverulent materials such as flour, in a polyethylene bag, is that of providing an adequate closure or seal means for such a bag. It has been found to be extremely difficult to heat seal the mouth of a polyethylene bag filled with a pulverulent material, such as flour, since the dust of the material itself interferes with a good seal between the respective panels or sheets of the bag.

Another problem associated with polyethylene bags which are to be filled with a particulate or pulverulent material, is the problem of constructing a bag which not only has suitable strength characteristics, but one which also has consumer acceptability with respect to its appearance and use. Although flat, pouch style polyethylene bags are now commercially used to some extent for packaging sugar and are available for use in packaging flour and the like, these bags have poor customer appeal since they have a rather floppy appearance and are difficult to stack on shelves in an orderly and compact manner.

Attempts have been made to form bottom gusseted, sideweld polyethylene bags so that these bags when filled with flowable particulate material, such as flour or the like, would assume a generally rectangular contour. However, due to normal machine operating tolerances, very difficult fabrication problems have been experienced in making such bags especially in a high volume operation. Further, such bags developed points of stress, where the innermost tuck point of the bottom gussets were fused to the sideweld line of the bag and these points of stress often resulted in pin-point apertures therein, which would also tear and fail during rough handling of such faulty bags. Further, the pulverulent material tends to escape through the apertures during handling of these faulty bags.

In attempting to make a closure other than by heat sealing, by attaching conventional paper covered tin ties or plastic extruded tin ties normally formed like electric insulating wire, it has been found very difficult and impractical as well as expensive, to attach these by spot gluing or taping. It has also been found exceedingly difficult to attach the usual tin-tie only to the spot area required by pressure and heat applied from outside of the tin-tie, against the tin-tie and in turn to an outer wall of the bag, as not only does the thickness of material form an excellent insulator requiring a great deal more heat to effect a seal, but the metal acts to carry and spread the heat along the whole length of the tie rather than bonding effectively and with low BTU consumption at the spot of the heat is applied to. It is commercially impractical to apply the heat from between the walls of the bag, against one wall and the tin-tie; and it is impractical to apply the tin-tie before the plastic sheet has been folded and the front and rear walls brought together.

It is therefore a general object of this invention to provide a novel and improved bag and method of making the same, in which the bag is formed on a thermoplastic material, preferably polyethylene, and is of the bottom-gusset sideweld type, with special seals that force it to have a box-like configuration when filled so as to facilitate stacking and to present a highly acceptable ornamental appearance.

Another object of this invention is to provide a bottom gusseted, sideweld thermoplastic bag and method of making the same, in which the bag is preferably formed of a polyethylene material and wherein each bag is also provided with reinforced seal zones in those areas (where the innermost tuck point of the bottom gusset meets the sidewelds) which are subjected to the most stress to thereby minimize, if not completely, preclude the occurrence of pin-hole apertures and tears in the bag when filled and shipped.

Another object of this invention is to provide a novel bottom gusset, sideweld thermoplastic bag, of simple and inexpensive construction, which is substantially moist impervious, has no odor, is chemically inert, and has relatively tough physical characteristics, and is therefore especially adaptable for use in packaging pulverulent material such as flour, sugar and the like.

A further object of this invention is to provide a novel bottom gusset, sideweld thermoplastic bag and method of making the same, including a novel tin-tie closure means that will not puncture the soft plastic film and to provide a highly effective sealed closure even when the bag is filled with a pulverulent material, and that allows the housewife to open the package, use a portion of the contents, and then reclose it with a tight seal so that it can be used as a "collapsing canister" on her pantry shelf.

A further object of this invention is to provide a novel bottom gusset, sideweld thermoplastic bag and method of making the same, in which the tin-tie is attached below the top of the bag, so that the top of the bag can be heat tacked with a number of welds in the case of pulverulent materials, or heat sealed in the case of non-pulverulent materials, to eliminate danger of pilferage of coupons, etc.; and the bag then rolled down and closed with the tin-tie; in such a way that the heat tacked or sealed top of the bag may be cut off by the user and the bag then reclosed by the tin-tie as before.

An additional object of this invention is to provide a means for collecting, handling, and dispensing the unfilled tin-tie bags after they have been formed, so that stacks of the tin-tie bags may be dispensed and filled on conventional plastic bag filling equipment such as the Mark-50 Bread Bagger, etc., as well as on revised versions of present bag dispensing and filling equipment for pulverulent materials, granulated sugar, etc.

Another object of this invention is to provide a novel tin-tie structure that will permit the tin-tie closure to be readily spot heat sealed to an outside face of the hermoplastic bag, at any position on the bag.

A further object of this invention is to provide a way of folding in the sheared end of the tin-tie that will protect against its cut edge puncturing the tin plastic bag, and yet allow usage of an inexpensive, high production tin-tie and method of application, that will not require dipping, coating or otherwise covering the ends of the tin-tie that would be both difficult and expensive for high production.

These and other objects and advantages of this invention will more fully appear from the following description made in connection with the accompanying drawings wherein like reference characters refer to the same or similar parts throughout the several views, and in which:

FIG. 1 is a diagrammatic perspective view of one apparatus system which may be advantageously used in carrying out the novel method for forming and filling the novel bag construction;

FIG. 2 is a fragmentary cross-sectional view illustrating the tuck forming means;

FIG. 3 is a diagrammatic cross-sectional view on an enlarged scale illustrating the gusset sealing apparatus;

FIG. 4 is a perspective view of a novel bag in the unfilled collapsed position;

FIG. 5 is a fragmentary side elevational view of a bag in an expanded condition illustrating a detail of construction thereof;

FIG. 6 is a diagrammatic perspective view of one apparatus system which may be advantageously used in the bag closing operation;

FIG. 7 is a fragmentary detailed view on an enlarged scale of one portion of the bag closing apparatus;

FIG. 8 is a fragmentary detailed view on an enlarged scale of another portion of a bag closing apparatus; and FIG. 9 is a perspective view illustrating a bag in a filled, closed position.

FIG. 10 is a fragmentary side elevational view of a bag;

FIG. 11 is a fragmentary perspective view of a slightly modified form of the apparatus illustrating the application of a tin-tie fastener to the folded sheet;

FIG. 12 is a cross-sectional view of the bag support and a bag just prior to the beginning of the bag filling operation;

FIG. 13 is a cross-sectional view similar to FIG. 12 but illustrating the bag in the partially filled condition; and FIG. 14 is a cross-sectional view similar to FIG. 13 but illustrating the bag in a filled extended condition.

The present invention contemplates the provision of a novel bottom gusseted sideweld thermoplastic bag formed in a high capacity continuous process which may be incorporated into a bag filling and closing operation. In the bag forming process, the thermoplastic material will be unwound from a roll of thermoplastic material and will be moved through a predetermined path of travel wherein the bag forming steps occur. The sheet of thermoplastic material will be folded longitudinally during its path of travel to form superimposed front and rear webs or panels. Although many kinds of thermoplastic materials are available, it is preferred that polyethylene be used since this material not only has many desirable physical and chemical characteristics, but is also quite inexpensive and is readily available.

After the sheet material is folded longitudinally of its lengthwise dimension, the fold line of the sheet will be engaged by tucking medium to form tuck of the bottom gusset in which the original fold line becomes a median fold line that extends upwardly between the front and rear panels from front and lower fold lines of the panels. The bottom gusset after the bag is formed, actually constitutes the bottom panel of the bag, and the provision of the corner seals of the front and back panels of the bottom gusset to the bottom of front and back faces of the bag respectively, ensure the bag when expanded assuming a relatively box-like configuration.

After the bottom gusset is formed, a separator is inserted between the panel portions of the bottom gusset, and a pair of angularly shaped heat sealing media are applied against the front and rear panels to heat seal the front and rear panels to front and rear panel portions of the bottom gusset. The bonded areas between each front and rear panel and the associated front and rear panel portions of the bottom gusset actually constitute generally V-shaped heat sealed bands, the legs of each heat sealed band extending upwardly from the lower fold line between the panel and the bottom gusset, and converging to join with the other leg of the V-shaped band at the median fold line, or at a point slightly beyond the median fold line. The apex of the V-shaped band then projects to or beyond the median fold line. In one form of the invention, the apex of the V-shaped band is modified to curve upwards from slightly below the median fold line, to a point slightly above the median fold line where it reverses its curve to form a rounded projecting point of the V, with adequate width at the point to allow for normal position variation in following step of bisecting this seal without forming an objectionable angular stress point or "pocket" inside the bag to tear within the bag.

Thereafter, the folded sheet of material is engaged by a heated severing and welding medium which is of well-known construction, which successively severs the folded sheet and which completes the formation of the bag. The severing and welding medium engages the folded sheet normal to its direction of travel and bisects the angular bonded band to actually form a sideweld along one side of each of two bags. Thus, each successive stroke of the severing and welding medium will constitute the final step in most instances in the formation of one bag.

The present bag, however, also includes a unique closure means which is of the tin-tie type and which may be applied to the bag either before or after the severing and welding stroke. In the embodiment shown, it will be noted that the tin-tie closure means are applied to the bag prior to the severing and welding stroke.

Referring now to the drawings and more specifically to FIG. 1, it will be seen that one apparatus system for forming and filling a bottom-gusseted sideweld thermoplastic bag is there shown. This apparatus designated generally by the reference numeral 10 is diagrammatically illustrated but does show the steps of carrying out the novel method for making the bottom gusset sideweld thermoplastic bag. An elongate sheet S of thermoplastic material, preferably polyethylene, is unwound from a roll M of such material, and is moved through a predetermined path of travel. This sheet of material is first moved over a folding plow 11 to fold the sheet longitudinally of its lengthwise dimension. The folding plow 11 may be of conventional construction and this folding step, per se, is conventional in the bag forming art. The folded sheet is then passed through a pair of vertically spaced apart guide rollers 12 so that the sheet forms superimposed front and rear panels. The free longitudinal edge of the rear panel R projects beyond the adjacent peripheral edge of the front panel F. The fold line of the folded sheet is then engaged by a tuck forming medium, which in the embodiment shown comprises a revolvable wheel 13, which engages the fold line 14 and urges the same between the front and rear panels to form the bottom gusset which eventually comprises the bottom panel of the bag when the formation of the bag is completed. It will be noted that in forming the re-entrant tuck or fold, the wheel 13 extends between the pair of spaced apart guide members 15 which project between the front and rear panels, as best seen in FIG. 2.

When the re-entrant tuck is formed, the fold line 14 then becomes a median fold line so that the tuck is comprised of rear bottom panel portion 16 and a front bottom panel portion 17. It will be further noted that the rear bottom panel portion extends between the rear lower fold line 18 and the median fold line 14 while the front bottom panel portion 17 extends between the front lower fold line 19 and the median fold line 14.

After the bottom gusset tuck has been formed, the folded sheet is longitudinally moved along a separator 20 which extends into the tuck between the front gusset panel portion and the rear gusset panel portion and this separator 20 is preferably formed of a heat resistant and adhesion resistant yieldable material, such as silicone rubber or the like. The front and rear gusset panels will be positioned on opposite sides of the separator 20 and the innermost end of the separator will engage the fold line 14 to apply slight pressure thereat.

An upper heat seal member 21 and a lower heat seal member 22, are simultaneously applied against the exterior faces of the front and rear panels adjacent the lower portions thereof to heat seal the front and rear panels respectively, to the front and rear gusset panels 16 and 17 respectively. The separator 20 serves to prevent fusing of the opposed faces of the gusset panels together.

It will be noted that the heat seal members 21 and 22, are of generally triangular shaped configuration and the upper heat seal member 21 has a small arcuate projection 21a formed therewith and projecting upwardly from adjacent the apical portion thereof. Similarly, the lower heat seal member 21 also has a relatively small arcuate projection 22a which projects outwardly beyond the apical portion thereof, as best seen in FIG. 3. These heat seal members will be disposed in opposed registering relation and will be simultaneously applied against the folded sheet to heat seal the front and rear panels to the associated front and rear gusset panels. In the embodiment shown, the heat sealing face of each heat sealing member is generally a right angular heat sealing face. It will be noted that the V-shaped bonds 23 securing the front and rear panels to the associated gusset panel extend upwardly from the lower fold line so that the apex area converges with and extends slightly above the fold line 14. The heating face on the small projection serves to produce a bond 24 that projects slightly beyond and above the fold line 14 of the gusset.

Referring now to FIG. 3, it will be seen that when the heat seal members 21 and 22 are in clamping relation with respect to the folded sheet, the separator member 20 will be positioned therebetween, and will terminate at the opposed faces defined by the projections 21a and 22a of these heat seal members. The inner face of the projection 22a is recessed, and a substantially flat compressible element 25 secured thereto, this compressible element being preferably formed of a heat and adhesion resistant yieldable material such as silicone rubber or the like which projects above the face of the associated heat seal member. With this arrangement, those portions of the front panel F and the rear panel R located adjacent but just above the median fold line of the gusset, may be clamped together and sealed. It is essential in performing this particular heat sealing operation that no space be left between the fused inner faces of the front and rear panels and the fold line 14. By providing the heat sealing members with a slight projection and with the provision of a compressible element on the projection of one of the heat sealing members, fusion will take place so that no space will be left between the fold line and the fused inner faces of the front and rear panels. If a pin hole or unfused volumetric space is left between the fold line and the fused inner faces of the front and rear panels adjacent the median fold line, this area would have less structural strength than the adjacent areas. Thereafter, when the bag is filled, this area is subjected to the greatest stress and experience has indicated that it quite often fails when the filled bag is subjected to handling. It will readily be seen that the occurrence of a small air space in that area of the finished bag which is subjected to the greatest stress would certainly not have the strength characteristics of a monolithic structure and would tend to tear when subjected to tension stresses. Therefore, the unique construction of the heat sealing member which permits heat sealing of the front and rear panels beyond the median fold line prevents the occurrence of a weak spot in the bag thus formed.

It is pointed out that while the angular bond 23 is approximately 90°, each included angle between the lower fold line and the angular bond is preferably 45°. It is further pointed out that each included angle between each bond 23 and the associated lower fold line may be within the range of 40 to 55°, although the optimum angle is 45° in order to impart the desired box-like configuration to the expanded bag. Further, a solid generally triangular seal may be formed by each heat sealing member rather than a relatively narrower inverted V-shaped bond as shown. However, a much greater amount of heat and cooling would be required to heat seal an entire triangular area of each panel to its associated gusset panel portion, and it is therefore preferred to heat seal these parts together by a narrow bond of inverted V-shaped configuration.

In actual practice, width dimension of each V-shaped seal, is approximately $3/16$ inch and there is a $1/16$ inch tolerance in cutting position of the weld, and a $1/16$ inch tolerance in depth of the fold line 14. The arcuate projections 21a and 22a on the upper and lower heat seal members projects arcuately approximately $1/4$ inch beyond the median fold line 14. Thus, arcuate extension bonds 24 seal the front and rear panels together approximately $1/4$ inch beyond the fold line 14. The sealing members also serve to seal the various panels and panel portions together, so that the top or innermost edge of the seal will be on an annular line with the juncture of bottom gusset fold line 14 and the inner edge of the sideweld, or above it.

An alternate method not illustrated of forming the angled bonds sealed only between the respective front and rear faces of the bag and the front and rear gusset panels, and the extension bond of face to back panel beyond the juncture point of the bottom gusset fold line 14 and the inner edge of the sideweld, is to make first the angled seal in one operation, and then at another station make the extension bond seal between the front and rear faces after the angular seals have cooled below the sealing point so that the front and rear faces of the bag would not be sealed angularly together through the gusset, when removed from the separator and pressed together. In practice this requires several additional stations to perform the operations, requiring an additional length to the bag making machine, and consequently additional tolerance for the registry of the seals and cutting or welding operations. In doing this, the second seal forming the extension seal, may also be extended to seal to the bottom edge of the bag which in some instances is helpful in maintaining an even bag dimension through this area of the bottom of the bag.

It is pointed out that the formation of the V-shaped seals between the front and rear panels and gusset panel portions requires interruption of the movement of the folded sheet and thereby comprises an intermittent type step. After the inverted V-shaped bonds have been formed, or the extension bond seal in the alernate method, the folded sheet is then engaged by a heated serving and welding knife 26, which cuts the sheet transversely in substantially right angles to its length. The heated severing and welding knife is of conventional construction and will be heated to a temperature sufficient to weld the severed edges of the front and rear panels together. It is also pointed out that the heated knife bisects the inverted V-shaped heat bonds so that an uninterrupted sideweld 27 is formed from the lower fold lines 17 and 18 throughout the respective lengths of the adjacent side edges of the front and rear panels. It will be noted that a single stroke of the heated knife in the embodiment shown, forms a sideweld on one completed bag while simultaneously forming a sideweld on the next adjacent bag which is then in an uncompleted condition.

The sideweld 27 not only welds the severed edges of the front and rear panels together below the median fold line 14 of the bottom gusset but also welds the adjacent edges of the front and rear gusset panels to each other and to the front and rear panels. The weld 27 has approximately 1/16 inch melt back on each side. Experience has indicated that in the formation of a 2½ mil polyethylene bag, the heated knife in the embodiment shown, would have a working tolerance of approximately plus or minus 1/16 inch to effectively pass through arcuate extension bonds of the V-shaped bonds 23.

As pointed out above, one of the problems associated with packaging pulverulent materials in thermoplastic bags is the problem of closing and sealing the bag. But when thermoplastic bags are used in packaging pulverulent materials such as flour, heat sealing of the open mouth of the bag becomes extremely difficult since some of the flour or other pulverulent material will coat the mouth and interfere with an effective heat seal. It has also been found desirable to provide bags with closure means that not only permit the interior bag to be substantially sealed with respect to the exterior, but also permit a user to reclose the bag effectively after it has been opened, especially with respect to bags containing family quantities of a material.

For example, in five pound bags of flour or the like, usually only a portion of the amount of flour will be removed therefrom at one time, and the users prefer to effectively close the bag rather than empty the contents into a canister or other permanent receptacle. Therefore, even if there were no problems associated with heat sealing bags that contained pulverulent materials such as flour, confectioners' sugar and the like, the user will still find it difficult to effectively reclose a heat sealed bag. Therefore, a novel tin-tie closure means has been provided which not only provides an effective original seal, but also permits the user to effectively close the bag after it has been opened and use it as a collapsing canister.

The tin-tie closure means designated generally by the reference numeral 28, in the embodiment shown, comprises an elongate strip of bendable metal, preferably aluminum, which is enclosed in a sheet of thermoplastic material, preferably polyethylene. In the preferred form, the tin-tie closure is formed by folding the sheet 30 around the metal strip 29 and thereafter bonding the sheet to the metal and bonding together the projections 30a of the sheet beyond the metal. It is also pointed out that the strip of metal 29 may be heat sealed between a pair of sheets of thermoplastic material extending beyond the metal on each longitudinal side, which in turn are heat sealed to themselves, rather than being enclosed within a single sheet of plastic material (as illustrated in the drawing).

Making the tin-tie extension in this manner rather than by extruding molten plastic around the metal through a die, permits use of thin gauges of film ranging from .0005″ to .003″, whereas a thickness of .010 to .0625 of plastic around the metal would normally be required for extrusion, and from about .020″ to .0625″ for the extension of plastic only to be used for sealing. Thus enclosing the metal and making the extension of one or more sheets of thin plastic film, eliminates the need for expensive extrusion apparatus and die, reduces the amount and cost of plastic required, and consequently the heat and time required for sealing to the bag.

The tin-tie closure is preferably applied to the outer face or rear surface of the rear panel R, either before or after the sidewelds 27 are formed. As shown, a roll 31 of the tin-tie material is supported in proximal relation with respect to the folded sheet S of material, and is applied to the folded sheet of material before the sidewelds are formed. It will be seen that the roll 31 is unwound, and any suitable cutting means, such as a cutting mechanism 32 will sever a predetermined length of material while the length is simultaneously bonded by suitable heat sealing mechanism 33 to the folded sheet of material. It will be noted that the bond 34 between each tin-tie closure and its associated bag extends longitudinally of the tin-tie closure 28 and longitudinally of the upper peripheral edge of the bag, sealing the film projection of the tin-tie to the face of the bag. The bond 34, however, terminates substantially short of the end portions of the tin-tie closure within the area forming a "face" of the bag when filled and square, thus leaving these portions free and unattached. It will also be noted that the tin-tie closure 28 also terminates inwardly of the respective side edges of the bag B when the latter is in the collapsed position, as best seen in FIG. 4.

In instances where it is desirable to make the bags in one operation and then at a later time or in a completely separate operation, dispense, open, fill and close the bags, the "lip" or extension of one face of the bag may be extended considerably above and beyond the point to which the tin-tie is sealed, and either holes punched into the lip above the tin-tie for assembling and dispensing a stack of the bags on wicket, or this excess lip may be used to staple a group of the bags together as common in the plastic bag dispensing art, etc.

However, in instances where in packaging of pulverulent materials it is desirable to prevent pilferage of premium coupons, etc., by heat welding the bag in various spots—or heat sealing it in non-pulverulent materials—the tin-tie has been so designed that it may be spot heat sealed substantially and at any desired position to one of the faces of the bag below its upper peripheral edges, by positioning a pressure receiving plate as a separator between the sheets forming the walls of the bag, and then applying spot pressure and heat against the film extension 30a of the tin-tie to seal it to the opposed face of the bag (as indicated in the drawing, but positioning the sealing and tin-tie dispensing unit over a different area of the web of bag material). Referring now to FIG. 11, it will be seen that the tin-tie closure is applied to the folded sheet S in spaced relation to the longitudinal edges of the sheet. As shown, a roll 31b of the tin-tie material is supported in proximal relation with respect to the folded sheet S of material, and is applied to the folded sheet of material before the sidewelds are formed. It will be seen that the roll 31b is unwound, and any suitable cutting means, such as a cutting mechanism 32b will sever a predetermined length of material and the material is bonded by suitable heat and pressure applying mechanism 33b to the folded sheet of material. It will be noted that the bond 34b between each tin-tie closure and its associated bag extends longitudinally of the tin-tie closure 28b and longitudinally of the upper peripheral edge of the bag, sealing the film projection of the tin-tie to the face of the bag. The bond 34b, however, terminates substantially short of the end portions of the tin-tie closure within the area forming a "face" of the bag when filled and square, thus leaving these end portions free and unattached. It will also be noted that the tin-tie closure 28b in one form of the invention terminates inwardly of the respective side edges of the bag B when the latter is in the collapsed position, as best seen in FIG. 11.

This is made possible by the projections of an edge of film 30a beyond the metal of the tin-tie, whereas if the heat were applied to the covered metal itself, the metal would diffuse the heat, and the application of so much heat would be required as to be impracticable. It is also impractical to attempt to spot heat seal the tin-tie to the face of the bag by applying heat from the inside of the bag requiring more complicated apparatus and a longer bag machine.

Referring again to FIGS. 1 and 6, it will be seen that the bag forming process may be very nicely accommodated in a filling and closing operation, so that each successively formed bag is filled with a material to be packaged and is thereafter automatically and mechanically closed. To this end, it will be seen that each bag B, as it is formed, will be in a flat collapsed state, and suitable bag opening and gripping means 35 comprising a pair of similar substantially flat expander plates 36, which are pivotally interconnected together by a pivot 37, will be mounted for insertion into one of the formed bags. Although not shown in the drawing, it is pointed out that the bag opening and gripping means is power operated so that when expander plates are inserted into the exterior of the bag to be filled and are pivoted away from each other, the bag B will be opened. Suitable suction mechanism 38 may be provided for initially engaging and gripping a collapsed bag for partially opening the same and for facilitating positioning of the bag over the bag opening means. It will be noted that when the bag is opened, it will be oriented in upright condition, and assumes a generally rectangular box-shaped configuration so that the widewelds 27 are then centrally located with respect to the respective side forming portions of the front and rear panels. The sealed triangular shaped flaps T force the bag to have its box-like configuration when the bag is expanded.

It will be noted that as soon as the empty bag is expanded by the bag opening and gripping means 35, each bag will then be moved to a filling station, where the bags will be oriented in an upright relation. A dispensing mechanism 39 comprising a hopper 40 having a dispensing tube 41 will be positioned in the expanded bag B, in the case of pulverulent materials or others where bottom loading is desirable, so that the discharge end of the dispensing tube 41 will be positioned adjacent the bottom of the bag. Relative vertical translation between the bag and dispensing mechanism may be effected so that the dispensing mechanism is progressively withdrawn from the bag as the material is dispensed therefrom. In the event that pulverulent material is being used to fill the bags, each bag will be very effectively filled from the bottom up and "boiling up" of the material will be reduced or eliminated. It is pointed out that the bag while being filled at the filling station, will be supported upon a suitable support structure.

The support structure may be a flat plate or may consist of a generally five-sided rectangular form, including a bottom wall and four upstanding sidewalls affixed thereto, the box-shaped support being approximately the same size as the filled bag to permit pressure packing in the bag. An alternative to this would be to provide a five-sided support 70 of generally rectangular configuration, as shown in FIGS. 12–14, and having an open top which would be slightly larger than an open bag to permit the materials to expand the size of the bag beyond its normal dimensions. The support 70 includes a bottom wall 71 and upstanding side walls 72 having a volumetric interior space 73 only slightly larger than the volumetric size of the filled bag. The bag may be expanded beyond its normal dimensions when filled as best seen in FIGS. 12–13. This arrangement will permit the bag after closing to shrink due to cold flow back toward its original size so that a very snugly filled package would be produced.

On materials where bottom or compression loading is not desirable, this position of the tube in the bag may be altered, or the bag may be merely positioned and supported on the conveyor underneath the filling spout or tube.

The bag will then be shifted to a shaking station, wherein the bag will be agitated or shaken by vibrating or shaking structure 42, which causes the particulate or pulverulent material to settle into any unfilled spaces in the bag and to assure uniform filling of each bag.

Each filled bag is then moved to the next station where dribble feeder means 43 will dispense small amounts of the material into the open end of the bag. Although not shown in the drawing, suitable scale means may be provided to permit check weighing to permit uniform filling by weight at the dribble feeder station and to adjust the bulk of the fill from the original filler as well. It is pointed out that after the bag which contains pulverulent and other particulate materials has been subjected to a shaking or vibrating action, the material will, on many occasions, settle so that the material does not properly fill the bag. Thus, a dispensing mechanism, such as the dribble feeder means 43 is provided which permits controlled dispensing of relatively small quantities of the material to be added to completely fill the bag.

The bag is then moved to a tamping station wherein a generally rectangular-shaped tamper 44 shaped and dimensioned to move through the open mouth of the bag, and having suitable apertures 45 therein is vertically reciprocated to tamp and slightly compress the material within the bag so that the bag is compactly filled to a fixed height. This can also be adjusted for pressure packing and expansion of the bag as in the original filling operation. The bag is then moved to a final station of the bag filling system, wherein the bag gripping means 35 is withdrawn from the filled bag and the sequential bag closing operation begins. In the event that the bag is pressure filled as pointed out above, or in the event it is otherwise not desirable on certain products, the tamping station may, of course, be omitted.

Referring now to FIG. 6, it will be seen that the filled bag will be supported for movement upon a supporting member and will be moved in a predetermined direction of travel. The supporting member designated generally by the reference numeral 46 may have a bottom support wall which is preferably of rectangular configuration to correspond to the bottom panel of the filled bag and which has peripheral walls affixed to and projecting upwardly from at least three edges thereof. It will be noted that the forward end of the support 46 as well as the upper end thereof is open and that the filled bag projects upwardly beyond the confines of the support member. When the bag is in the filled condition as shown in FIG. 6, the tin-tie closure 28 projects outwardly beyond the side panels of the bag.

During the closing operation, both of the side panels of the bag are engaged by side tucker members 47, which as shown, are generally triangular in configuration each having an opening 48 therein. It will be seen that the side tucker members 47 have a substantially flat upper surface and the apex of each side tucker member defines an angle of approximately 90°, but all points and edges contacting the film material are rounded to prevent cutting.

The rear panel R of the filled bag is also engaged by rear tucker member 49, which together with the side tucker members, collapse the rear and side panels of the bag inwardly. The support structure 46 also constitutes a conveyor means for moving the filled bags in a predetermined direction of travel during the closing operation. As the side panels P and the rear panel R have been engaged and tucked inwardly by the rear and side tucker members, the filled bag during its travel will pass under an idler or tucking plate, not shown, to tuck down the front panel, and then be engaged by an endless flexible belt or apron member 50, which has its lower run moving in the direction of movement of the supporting structure 46. Thus, the unfilled upper portion of the bag will be engaged by the conveyor belt and will be collapsed rearwardly, so that the tin-tie closure 28 projects outwardly therefrom. The endless apron or belt 50, is trained about a drive roller 51 and an idler roller 52, so that the lower run thereof will engage the collapsed upper portion of the bag during the closing operation.

After the unfilled upper portion of the bag has been tucked and collapsed, the outwardly projecting end portions of the tin-tie closure 28 will be engaged by the slotted ends 55 of a pair of similar roll chucks 53. The chucks will revolve in a clockwise direction as viewed in FIG. 6 and as indicated by the arrows to revolve the collapsed tucked unfilled upper end portion of the bag into a relatively tight roll tightly against the squared upper surface of the filled bag which is defined by the material contained therein. The yieldable belt holds the upper face of the film down so the tin-tie will roll it up, the belt being free at this point to move upwards as the tin-tie turns and displaces it. After the upper tucked end portion of the bag has been rolled by the roll chucks 53, the roll chucks will then be oriented so that a slot 54 in each roll chuck is oriented vertically. It will be noted that the slot 54 communicates with the associated end slot 55 of each roll chuck 53. A pair of impact members 56 which reciprocate vertically will then move downwardly to strike the loose ends of the tin-tie extending beyond the gripped portion, downwardly at substantially right angles to their overall longitudinal dimensions.

Thereafter, each bag is then moved to the next station wherein a substantially flat pressure plate 57 is positioned above and in very close proximity to the upper surface of the lower run of the endless belt 50. When the bag is moved into this position, each bent end of the tin-tie closure will be engaged by one of a pair of first bending member 58 which is power operated to further bend the downwardly struck ends of the tin-tie approximately another 90° to fold or bend the ends of the tin-tie closure against itself, while supported by the pressure plate extending beyond the belt.

The bag is then moved to the final closing station wherein the pressure plate 57 has portions of the marginal edge areas which are flared upwardly and outwardly as at 57a so that the lower surface of marginal flared portions 57a are spaced upwardly from the adjacent marginal portions of the endless belt 50. When this point or station is reached, the side tucker members 47 will be moved or swung upwardly so that their respective upper surfaces are inclined downwardly and inwardly to separate the roller end of the bag from the filled body of the bag and angle this portion of the tin-tie the top of the bag and the belt upwardly to permit the final folding action of the tin-tie closure. The ends of the tin-tie closure are engaged by a pair of second bending members 59 which are power operated, and which are mounted for pivoting movement through the openings 48 in the side tucker members 47, to bend the end of the tin-tie down over the edge of the bag and then inwardly and upwardly against the rolled tin-tie and bag. The bending action of the bending member 59 completes the bending of the ends of the tin-tie and the upper swinging movement of the side tuckers 47 permit the bent ends of the tin-tie to be positioned within the tucks formed at the tucked rolled closed upper end of the filled bag. It will be seen that the upwardly flared side portions of the pressure plate 57 permit this final bending of the tin-tie so that it is positioned within the tuck.

With this arrangement, the cut end of the tin-tie is enclosed in the two folds of the tin-tie, and the tin-tie closure does not present any sharp edges against the filled thermoplastic bag even though the bag is tightly and snugly closed in sealing relation with respect to the exterior. The terminal bend of the tin-tie closure clamps the folded end of the tin-tie strip against the roll of folded material and locks the same against unrolling.

However, when it is desirable to open the bag, a user may merely unfold the outermost bend of the tin-tie strip and unroll the sealed rolled mouth end of the bag. The bag may also be closed manually by the user by rolling the mouth end of the bag downwardly and by folding the ends of the tin-tie closure against itself to clamp the folded roll in its tightly wound condition. After clamping of the end of the tin-tie by the bending members 59, these and the side tucker members 47 retract from the bag, and the closed bag is moved by support means 46 and the upper belt, under the pressure plate which flattens down the bent ends of the tin-tie.

After the bag has been closed, a support member 46 will move the same so that it is engaged and supported by belt type conveyor 60, which moves the filled enclosed bag to a collection station.

It will be noted that by providing the bag with the sealed triangular shaped flaps, the bag will retain its squared configuration and may be readily and very easily stacked for display, storing and the like. This symmetrical shape of the bag has a relatively high degree of customer appeal, in addition to the above-mentioned functional advantages of such bags. It will further be noted that when the bag is filled with a material, the side portions of the bottom gusset which forms the bottom panel are suspended from the bond attaching the bottom gusset to the sidewell and by utilizing the unique heat sealing steps in the formation of these triangular shaped side flaps, those particular points or zones which are subjected to the most stresss actually constitute monolithic zones with no air spaces or unbonded points. Thus, the attendant danger of failure due to pin-point openings is completely precluded by this novel process.

Further, by utilizing a unique tin-tie closure means which may be readily applied to the bag during the formation thereof, a closure is provided which permits the bag to be very effectively closed and permits the same to be opened and reclosed by a user when desired, forming a functional "collapsing canister." The steps of folding the ends of the tin-tie type closure upon itself prior to the final closing step, also completely precludes the filled bag from being torn by sharp edges. The closure means, while permitting the bag to be effectively sealed with respect to the exterior, also completely avoids the many problems attendant in the closing of conventional thermoplastic bags when the bags are filled with a pulverulent material, such as flour, confectionary sugar and the like.

Thus, it will be seen, that I have provided a unique thermoplastic bag which may be formed in a high volume operation by my novel process.

It will also be noted from the preceding description that my novel bag not only may advantageously be formed to provide the box-like configuration, but is constructed of a thermoplastic material which is transparent and moisture proof and which has high strength characteristics and is therefore much more desirable in the packaging of certain materials than paper.

Thus, it will be seen, that I have provide a novel bag formed from thermoplastic material which is not only of simple and inexpensive construction but one which functions in a more efficient manner than any heretofore known comparable bag.

It will, of course, be understood that various changes may be made in the form, details, arrangement and proportions of the various parts without departing from the scope of my invention.

What is claimed is:

1. A continuous process for forming bottom-gusseted, sideweld open mouth bags, said process comprising,
   moving an elongate sheet of thermoplastic material through a predetermined path of travel and during the said travel folding said sheet longitudinally of its directions of travel to form superimposed front and rear panels, engaging the fold line of said folded sheet of material during said travel with a tuck forming medium and urging the fold line inwardly between the panels to form a tucked fold line of a bottom gusset, the bottom gusset being defined by front and rear bottom gusset portions extending from the tucked fold line to the lower fold lines between the front and rear panels and the bottom gusset, inserting a separating medium between the front and rear portions of said bottom gusset and applying heating media to opposed portions of the folded sheet to form inverted generally V-shaped heat sealed areas bonding the lower portion of the front panel to the front bottom gusset portion, and bonding the rear panel to the rear bottom gusset portion, each inverted V-shaped heat sealed area converging upwardly from adjacent the associated lower fold line to a point located slightly above and tucked fold line of the bottom gusset, each included angle between the lower fold line and the converging side of the inverted V-shaped bonded area being within the range of 40–55°, continuing the travel of the folded sheet with the separating medium inserted between the front and rear portions of the bottom gusset until the bonded areas have cooled below the sealing temperature, successively severing said folded sheet with a welding and severing medium transversely and at substantially right angles to the direction of travel thereof, so that each successive stroke of the severing and welding medium simultaneously forms one side of each of a pair of bags.

2. The process as defined in claim 1 and the step of applying and securing an elongate tin-tie fastener member to each bag, each fastener member including an elongate strip of bendable material, elongate thermoplastic sheet covering said strip and being bonded thereto and extending laterally from a longitudinal edge thereof, a lateral extension of the thermoplastic sheet of said fastener member having its central portion only, heat sealed to one of said panels adjacent the upper peripheral edge thereof.

3. A process as defined in claim 1 and the additional steps of moving each formed bag in a predetermined path of travel and during said travel inserting and engaging the interior of each bag with an expansible bag opening medium to open the bag, dispensing a particulate material into each bag to substantially fill the same, then removing the bag opening medium.

4. The process as defined in claim 1 and the additional steps of applying and securing an elongate tin-tie fastener to each bag, each fastener member including an elongate strip of bendable material, thermoplastic covering said strip of bendable material, moving each formed bag in a predetermined path of travel and during such travel engaging each bag with bag opening medium to open the bag, dispensing a material into each bag to substantially fill the same, engaging the unfilled upper portion of the bag and tucking the same inwardly, engaging the fastener member with mechanical folding media and progressively folding the strip of said fastener member whereby the unfilled inwardly tucked upper end portion of the bag is wound upon the closure member, engaging the outer ends of the closure member with first mechanical bending media to bend the outer ends of the fastener member upon itself, and engaging the bent ends of the closure member with second mechanical engaging media to further bend the bent ends of the fastener member upon itself.

5. A process of closing a filled bag of the type formed of thermoplastic material and including front and rear panels, an elongate tin-tie fastener member extending transversely of and secured to the bag adjacent the open mouth, said fastener member including an elongate bendable strip of material of metal or the like which is substantially dimensionally stable, elongate thermoplastic sheet covering said strip and being bonded thereto and extending laterally from a longitudinal edge thereof, a lateral extension of the thermoplastic sheet of the fastener member having its central portion only sealed to that part of one of the panels forming a face of the open filled bag, the fastener member projecting outwardly beyond the sides of the bag when the bag is in the expanded filled condition, said process comprising moving the bag in a predetermined path of travel and during said movement engaging the unfilled upper portion of the bag with tucking media and tucking the same inwardly, engaging the unfilled upper portion of the bag with a pressure applying medium to generally collapse the unfilled upper portion together, engaging the fastener member with a mechanical folding media and moving the mechanical folding media from its point of initial contact with the fastener member, to a point substantially in the vertical transverse centerline plane of the filled bag and simultaneously during said movement revolving the closing media to progressively roll the unfilled portion of the bag around said fastener member, engaging the outer ends of the closure member with first mechanical bending media to bend the outer ends of the fastener member upon itelf, and engaging the bent ends of the closure member with second mechanical engaging media to further bend the bent ends of the fastener member upon itself so that the bent ends thereof are positioned and tucked interiorly at the sides of the folded tucked side portions of the bag.

6. A continuous process for forming sideweld open mouth bags, said process comprising moving an elongate sheet of thermoplastic material through a predetermined path of travel and during the travel folding said sheet longitudinally of its direction of travel to form superimposed panels, one of the panels being of a greater length than the other panel to define a lip, unwinding a strip of tin-tie material from a roll of such tin-tie material and moving said strip in a predetermined path of travel, the strip of tin-tie material comprising an elongate strip of bendable material, thermoplastic covering the strip of bendable material, moving said strip of tin-tie material during said travel into engaging relation with the lip of said one panel, engaging a small lineal portion of the strip of tin-tie material with heat, and pressure-applying media to press and seal the strip of tin-tie material to the lip of said one panel at the central portion thereof only so that the seal is less than the width of the lip of the panel, severing the strip of tin-tie material with a cutting medium so that the severed strip of tin-tie material generally approximates the width of the panels, severing said folded sheet with a welding and severing medium transversely and at substantially right angles to the direction of travel thereof so that each successive stroke of the severing and welding medium simultaneously forms one side of each of a pair of bags.

7. A continuous process for forming sideweld open mouth bags, said process comprising moving an elongate sheet of thermoplastic material through a predetermined path of travel and during the travel folding said sheet longitudinally of its direction of travel to form superimposed panels, unwinding a strip of tin-tie material from a roll of such tin-tie material and moving said strip in a predetermined path of travel, the strip of tin-tie material comprising an elongate strip of bendable material, thermoplastic covering the strip of bendable material, continuing travel of the folded sheet and positioning a separating medium between the panels thereof, moving the strip of tin-tie material during the travel thereof into engaging relation with the exterior surface of one of the panels in opposed relation with the separating medium, the strip of tin-tie material engaging said one panel in spaced relation with respect to opposite edges thereof, engaging a small lineal portion of the strip of tin-tie material with heat, and pressure-applying media to press and seal the strip of tin-tie material to said one panel at one central portion thereof only so that the seal is less than the width of the panel, severing the strip of tin-tie material with a cutting medium so that the severed strip of tin-tie material generally approximates the width of the panels, severing said folded sheet with a welding and severing medium transversely and at substantially right angles to the direction of travel thereof so that each successive stroke of the severing and welding medium simultaneously forms one side of each pair of bags.

8. Process for filling a thermoplastic bag which, when stressed, is subject to cold-flow, said process comprising positioning a thermoplastic bag within a confining medium defined by a bottom wall, and upstanding side walls which present a closed continuous inner surface and whose perimeter is similar and slightly larger than the perimeter of a filled bag, introducing material into the bag to fill the major portion thereof while the bag is positioned within said confining medium, applying pressure against the material within the bag while the bag is so confined so that the material within the bag urges the exterior surfaces of the bag outwardly thereby increasing the perimeter of the bag until the bag engages the vertical walls of the confining medium, closing the unfilled portion of the bag snugly against the upper surface of the material whereby the plastic material of the bag, in response to such subsequent cold-flow, will contract and shrink so that the bag is snugly filled.

9. The process as defined in claim 5 wherein the bag is filled with a material compressing the material therein through the open mouth of the bag to compact the material and stretch the thermoplastic bag, whereby closer uniform tucking of the unfilled upper portion of the bag is facilitated, and whereby contraction of the bag after closing will urge closed folded and tucked upper portion thereof downwardly to snugly fit and conform to the upper surface of material therein.

References Cited
UNITED STATES PATENTS

| | | | |
|---|---|---|---|
| 2,023,682 | 12/1935 | Higginbottom | 53—14 |
| 2,138,111 | 11/1938 | Long | 53—45 X |
| 2,328,766 | 9/1943 | Yates | 53—24 |
| 2,885,846 | 5/1959 | Harker | 53—183 X |
| 3,023,679 | 3/1962 | Piazze | 93—35 X |

THERON E. CONDON, Primary Examiner

R. L. SPRUILL, Assistant Examiner

U.S. Cl. X.R.

53—24, 29, 45, 46, 128, 378; 93—1, 35